US011336080B1

(12) United States Patent
Rosplock (10) Patent No.: US 11,336,080 B1
(45) Date of Patent: May 17, 2022

(54) SLOTTED GROMMET

(71) Applicant: James D. Rosplock, Roscoe, IL (US)

(72) Inventor: James D. Rosplock, Roscoe, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/145,566

(22) Filed: Jan. 11, 2021

(51) Int. Cl.
*H02G 3/04* (2006.01)
*B64D 41/00* (2006.01)

(52) U.S. Cl.
CPC ........... *H02G 3/0456* (2013.01); *B64D 41/00* (2013.01)

(58) Field of Classification Search
CPC ...... H02G 3/22; H02G 3/0456; H05K 5/0247; H05K 5/069; B60R 16/0222; B60R 16/0215
See application file for complete search history.

(56) References Cited

U.S. PATENT DOCUMENTS

| | | | |
|---|---|---|---|
| 2,573,600 | A | 10/1951 | Pruehs |
| 6,723,923 | B2 | 4/2004 | Tsukamoto |
| 8,153,897 | B2 | 4/2012 | Yamamoto |
| 9,199,586 | B2 | 12/2015 | Saunders et al. |
| 9,598,028 | B2 | 3/2017 | Renner |
| 10,283,950 | B2 | 5/2019 | Gintz |
| 2005/0121561 | A1 | 6/2005 | Sweigard |
| 2008/0121763 | A1 | 5/2008 | Mori et al. |
| 2011/0157902 | A1* | 6/2011 | Forsman ................ H02G 3/20 362/404 |
| 2012/0298415 | A1* | 11/2012 | Schwartz ............. H02G 15/013 174/652 |
| 2018/0062318 | A1 | 3/2018 | Sze |

FOREIGN PATENT DOCUMENTS

| | | |
|---|---|---|
| CN | 202937887 U | 5/2013 |
| CN | 208423676 U | 1/2019 |
| DE | 10119736 A1 | 11/2001 |
| GB | 2407439 A | 4/2004 |
| WO | WO 2012/164772 A1 | 12/2012 |
| WO | WO 2014/188858 A1 | 11/2014 |

OTHER PUBLICATIONS

"Baseus Magnetic Wire Organiser Clip USB Cable Organizer Clamp Cable Protector Price in India—Buy Baseus Magnetic Wire Organiser Clip USB Cable Organizer Clamp Cable Protector online at Flipkart.com", *Flipkart Internet Private Limited*, Mar. 31, 2019, 4 pages. URL: https://www.flipkart.com/baseus-magnetic-wire-organiser-clip-usb-cable-organizer-clamp-protector/p/itm0f43e5662558e.

* cited by examiner

*Primary Examiner* — Hoa C Nguyen
*Assistant Examiner* — Amol H Patel
(74) *Attorney, Agent, or Firm* — Reinhart Boerner Van Deuren P.C.

(57) ABSTRACT

Embodiments of a slotted grommet configured to manage a cable in an electrical cavity are provided. The slotted grommet includes a body structure having a first surface, a second surface opposite to the first surface, and a peripheral surface extending between the first and second surfaces. A first slot is formed in the first surface and extends through the body structure towards the second surface. The first slot defines a chamber having sidewalls in the body structure configured to hold a loop of the cable. The first slot has a first width that is less than a cross-sectional dimension of the cable such that the cable is pinched within the chamber between the first sidewalls to prevent vibration-related chafing of the cable.

20 Claims, 13 Drawing Sheets

SLOTTED GROMMET

FIELD OF THE INVENTION

This invention generally relates to a cable management device, in particular to a grommet configured to protect against cable chafing.

BACKGROUND OF THE INVENTION

Figure 13:
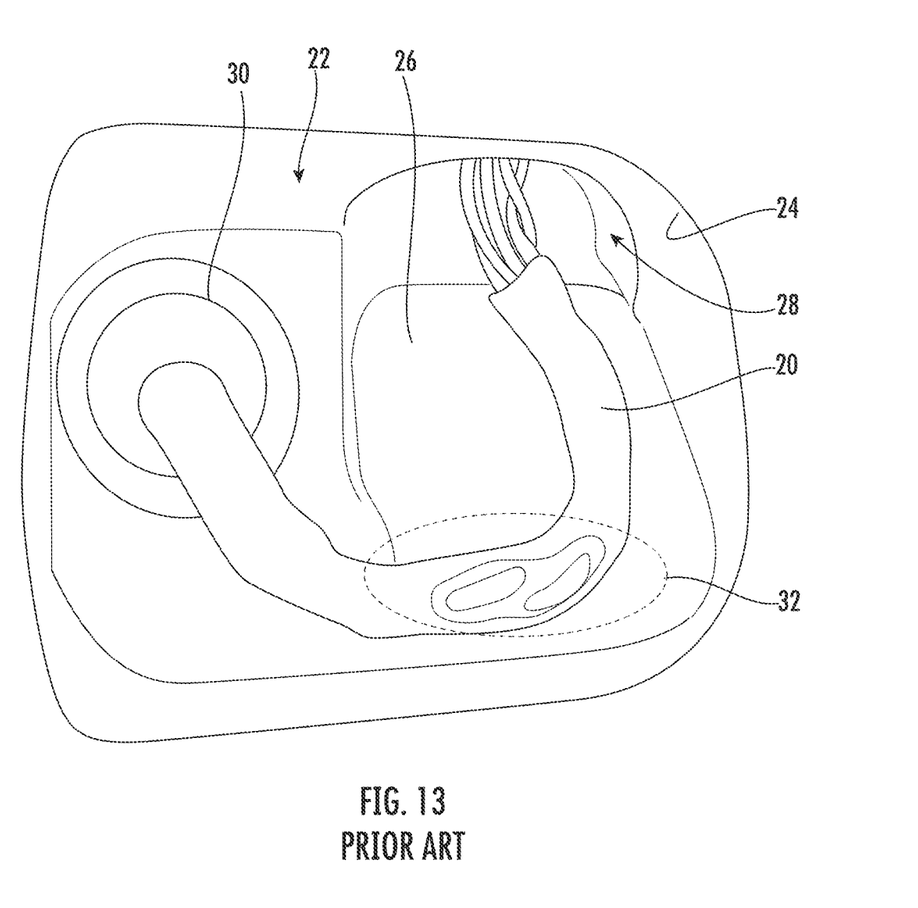
FIG. 13 is a prior art depiction of a wire bundle in an electrical cavity having experienced chafing during normal use.

In aircraft many line-replaceable units (LRUs) include electrical components such as linear variable differential transformers (LVDTs) and servo valves. These components have wires that lead to electrical connectors. These wires are collected in bundles and wrapped in a sleeve to protect against wear and electrical shorts. However, as shown in FIG. 13, the sleeve in which the wires are bundled is prone to chafing within an electrical cavity. In FIG. 13, a wire bundle 20 can be seen within an electrical cavity 22. In the example electrical cavity 22 depicted, the electrical cavity 22 is defined by a peripheral sidewall 24 and a cavity floor 26. A first port 28 is formed in the sidewall 24, and a second port 30 leads out of the cavity floor 26. The wire bundle 20 enters through the first port 28 of the electrical cavity 22 and exits through the second port 30. As can be seen in FIG. 13, the wire bundle 20 includes some slack within the electrical cavity 22 in order to allow for servicing and inspection of the electrical components. During operation of the aircraft, vibration causes the wire bundle 20, which is able to move within the cavity 22 because of the slack, to chafe (denoted by region 32) against surfaces of the electrical cavity 22, such as the floor 26, peripheral sidewall 24, or lid (not shown). As shown in FIG. 13, the chafing causes the sleeve of the wire bundle 20 to wear away and can even damage the wires within the bundle 20.

Attempts to address this issue have so far not been effective. For example, the slack in the wire bundle has been wrapped around posts to keep the bundle in place during operation. However, such posts were relatively large and did not fit within many existing electrical cavities. Thus, adoption of such posts would require substantial retrofitting of existing designs, and new designs would need to be made larger, increasing the size and weight of the LRUs.

Further, the wire bundles have been encapsulated in a potting compound within the electrical cavity. While this prevents any chafing by locking the wire bundles in place within the cavity, the potting compound also makes routine service and inspection of the LRU difficult. That is, once the wire bundle has been encapsulated in the potting compound, the potting compound has to be removed in order to gain access to the wire bundle, e.g., to re-pin connectors.

Thus, chafing of the wire bundle remains a problem for which no solution has yet been identified that allows for ease of retrofitting, that avoids larger and heavier designs, and that provides access to the wire bundle for service and inspection. Embodiments of the present invention overcome or reduce such problems.

BRIEF SUMMARY OF THE INVENTION

According to the present disclosure, Applicant has identified a solution to the foregoing problems associated with preventing chafing of wire bundles within electrical cavities of LRUs. As will be discussed more fully below, the wire bundle is substantially immobilized in a slotted grommet to prevent vibration that leads to chafing in an electrical cavity. The slotted grommet is made of an elastomeric material, allowing it to securely hold the wire bundle and also to compress within an electrical cavity. This allows the slotted grommet to be used with a variety of differently shaped and sized electrical cavities, enhancing retrofit ability. Further, because the wire bundle is held in place only by frictional engagement with the elastomeric material, the wire can easily be removed for service and maintenance. These and other advantages of the invention, as well as additional inventive features, will be apparent from the description of the invention provided herein.

According to an aspect, embodiments of the present disclosure relate to a slotted grommet configured to manage a cable in an electrical cavity. The slotted grommet includes a body structure having a first surface, a second surface opposite to the first surface, and a peripheral surface extending between the first surface and the second surface. Further, the slotted grommet includes a first slot formed in the first surface and extending through the body structure towards the second surface. The first slot defines a chamber having first sidewalls in the body structure configured to hold a loop of the cable. The first slot has a width that is less than a maximum cross-sectional dimension of the cable such that the cable is pinched within the chamber between the first sidewalls.

In certain embodiments, the body structure is made of a fluoroelastomer. Further, in embodiments, the fluoroelastomer has a Shore A hardness of 50 to 70.

In certain embodiments, the slotted grommet further includes a second slot formed in the first surface and in the peripheral surface. The second slot intersects with the first slot and defines a first passage having second sidewalls. The first passage intersects the chamber, and the second slot has a second width that is less than the cross-sectional dimension of the cable such that the cable is pinched within the first passage between the second sidewalls.

In certain embodiments, the first slot and the second slot intersect at an angle of 45° to 135°.

In certain embodiments, the body structure includes a cable management section and an extension section. The cable management section includes the first slot and the second slot, and the extension section is configured to engage a wall of the electrical cavity. In examples of such embodiments, the extension section spans 25% to 100% of a thickness between the first surface and the second surface. In examples of such embodiments, the first slot defines a second passage through the peripheral surface. Further, in examples of such embodiments, the first passage has a first floor surface, the second passage has a second floor surface, and the chamber has a third floor surface. A first plane includes the first floor surface, and a second plane includes the second floor surface. The first plane and the second plane are parallel to and spatially disposed from a third plane including the third floor surface. In further examples of such embodiments, the first plane is parallel to and spatially disposed from the second plane such that the second floor surface is intermediate of the first floor surface and the third floor surface.

In certain embodiments, the first slot extends from the first surface to the second surface. In certain other embodiments, the first slot includes a floor surface intermediate of the first surface and the second surface, and an aperture extends from the floor surface to the second surface.

According to another aspect, embodiments of the present disclosure relate to a method of preventing chafing of a cable in an electrical cavity. The method involves inserting a slotted grommet into the electrical cavity. The slotted grommet includes a body structure with a first surface, a second surface opposite to the first surface, and a peripheral surface extending between the first surface and the second surface. Further, the slotted grommet includes a first slot formed in the first surface and extending through the body structure towards the second surface. The first slot defines a chamber having first sidewalls in the body structure. In the method, the cable is first extended into the slotted grommet. The cable is looped within the chamber so that the cable is held between the first sidewalls. The cable is second extended out of the slotted grommet.

In certain embodiments, wherein the first slot includes an aperture through the second surface, and the cable is first extended into or second extended out of the slotted grommet through the aperture.

In certain embodiments, the slotted grommet further includes a second slot formed in the first surface and in the peripheral surface. The second slot intersects with the first slot and defines a first passage having second sidewalls. The first passage intersects the chamber, and in the method, the cable is pinched in the first passage between the second sidewalls.

In certain embodiments, the first slot defines a second passage through the peripheral surface, and in the method, the cable is first extended into or second extended out of the slotted grommet through the second passage.

In certain embodiments, the step of inserting includes filling from 50% to 75% of a volume of the electrical cavity with the slotted grommet.

In certain embodiments, wherein the body structure includes a cable management section and an extension section and the cable management section includes the first slot and the second slot, the method includes the step of engaging a wall of the electrical cavity with the extension section.

In an example of such an embodiment, the extension section spans from 25% to 75% of a thickness between the first surface and the second surface such that the extension section defines an intermediate overhang. The electrical cavity has a tiered structure with an upper ledge and a lower ledge. The embodiment of the method includes the step of contacting the lower ledge with the second surface and contacting the upper ledge with the extension member.

In certain embodiments, the slotted grommet includes at least one reduced area component formed on or into the first surface of the body structure, and embodiments of the method further include the step of contacting a lid of the electrical cavity with the at least one reduced area component or the first surface.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of a slotted grommet configured to protect a cable in an electrical cavity are described herein and are shown in the accompanying figures. As discussed above, electrical cavities in certain installations are subject to significant vibrations that can lead to premature failure of a wire bundle or a cable (hereinafter, referring to both simply as "cable") contained therein. The slotted grommet is designed to substantially address such failures by firmly holding and positioning the cable within the electrical cavity so that the cable does not rub against the walls or lid of the cavity. In embodiments, the slotted grommet is made of an elastomeric material that is configured to be compressed within the electrical cavity to wedge the slotted grommet in place. Further, the elastomeric material prevents the cable from slipping or moving within the cavity. These and other aspects and advantages of the disclosed slotted grommet will be described more fully below. The embodiments disclosed herein are provided by way of illustration, not limitation.

Figure 1:
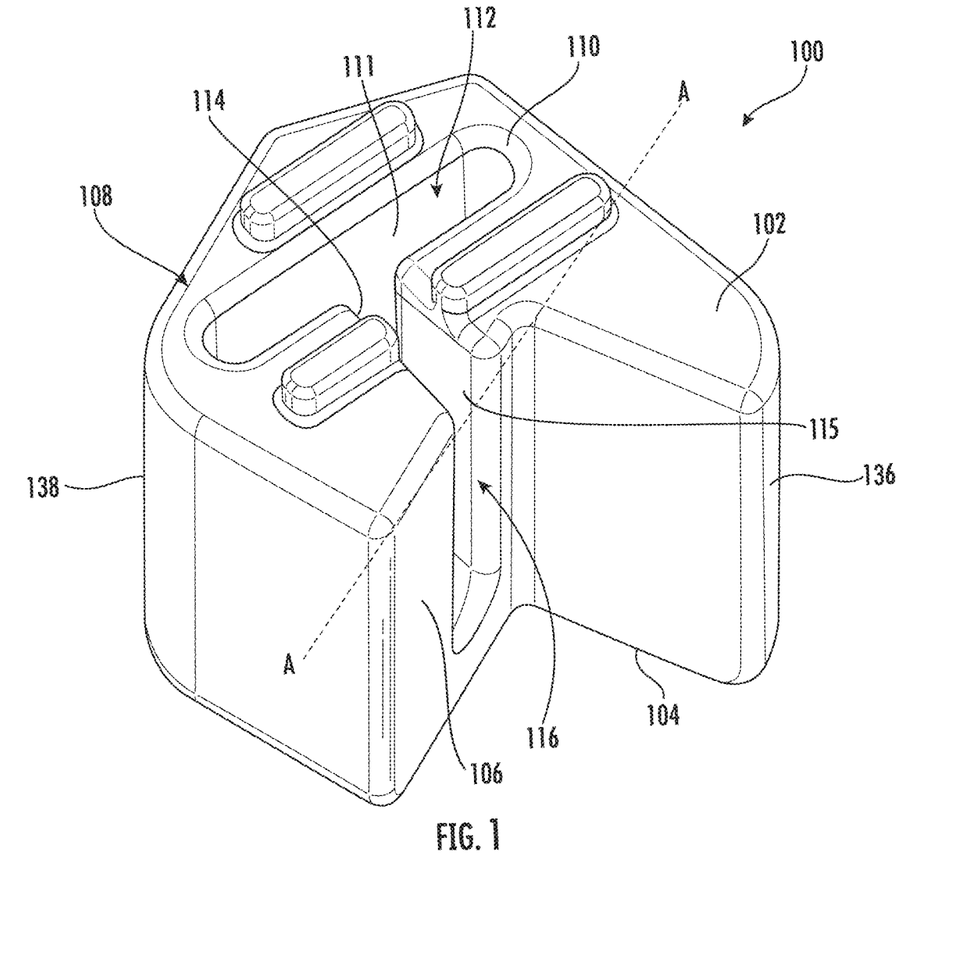
FIG. 1 is depicts a perspective view of a slotted grommet, according to an exemplary embodiment.

FIG. 1 depicts an embodiment of a slotted grommet 100. The slotted grommet 100 has a first surface 102 spatially disposed from a second surface 104. A peripheral surface 106 extends between and connects the first surface 102 and the second surface 104. The first surface 102, the second surface 104, and the peripheral surface 106 define a body structure 108. A first slot 110 is formed through the first surface 102, and first sidewalls 111 of the first slot 110 extend into the thickness of the body structure 108, defining a chamber 112. A second slot 114 is formed through the first surface 102 and the peripheral surface 106. Second sidewalls 115 extend from the second slot 114 into the thickness of the body structure 108, defining a passage 116 through the peripheral surface 106. The second slot 114 intersects with the first slot 110, and the passage 116 intersects with the chamber 112.

Figure 2:
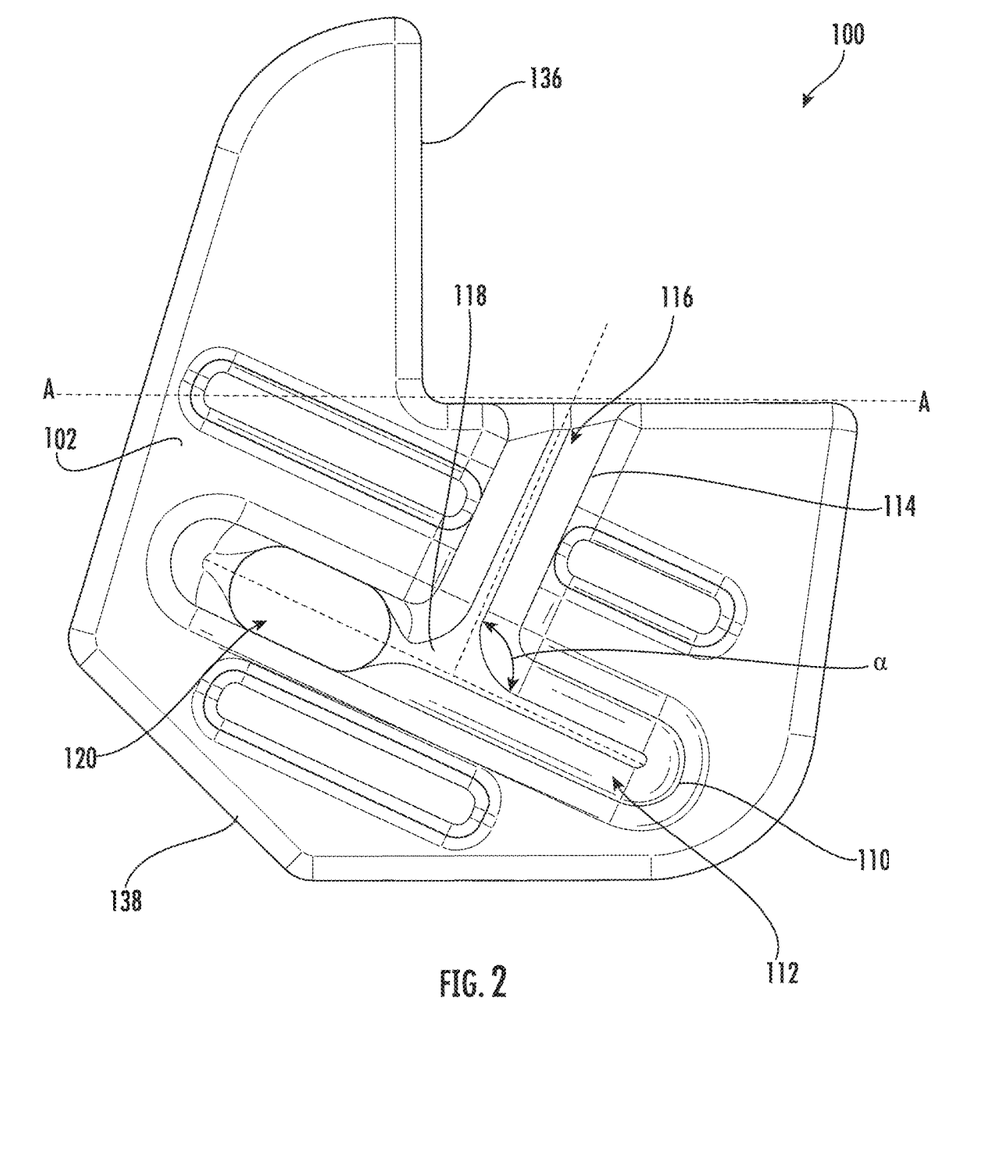
FIG. 2 depicts a top view of the slotted grommet of FIG. 1, according to an exemplary embodiment.
Figure 3:
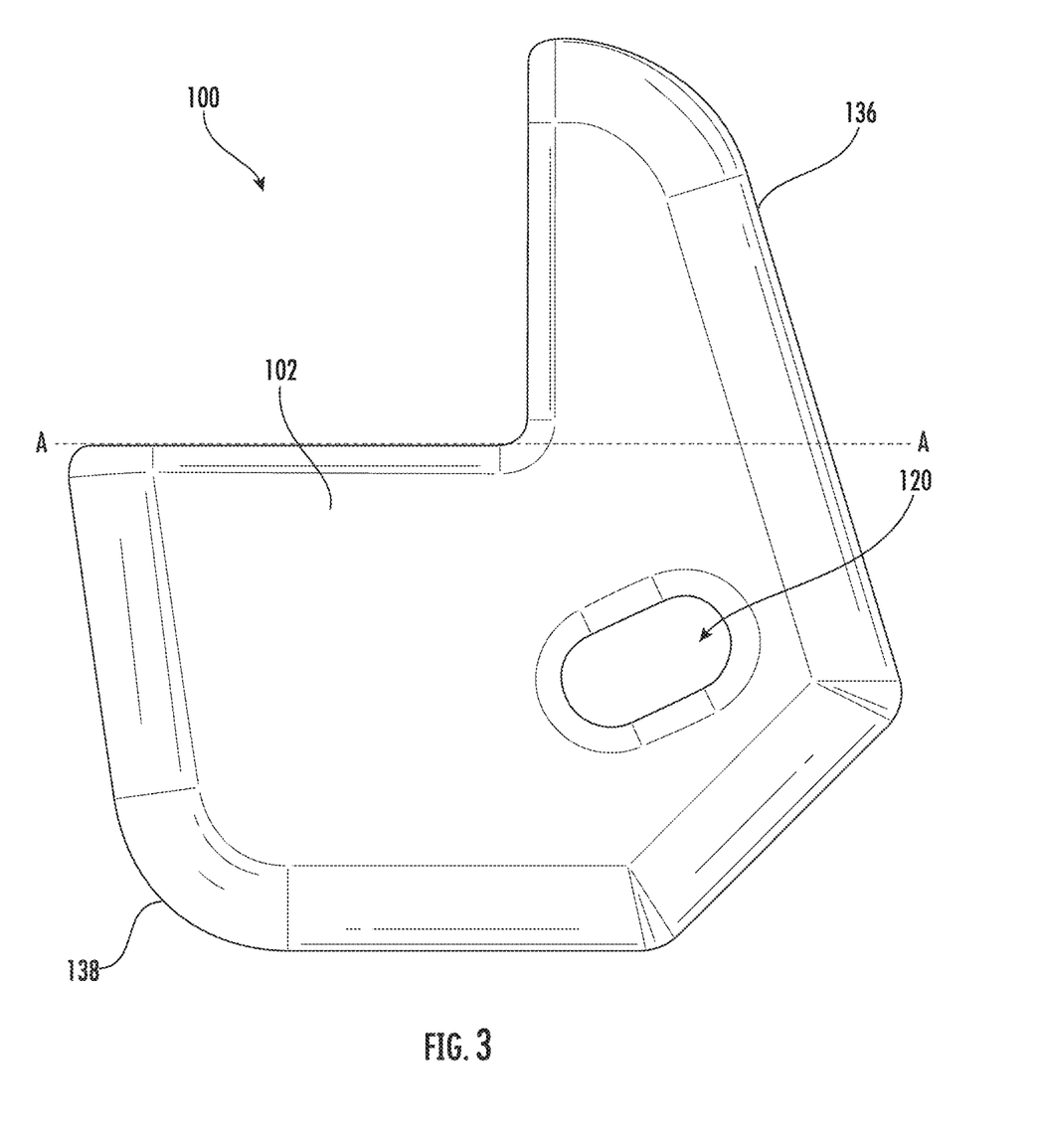
FIG. 3 depicts a bottom view of the slotted grommet of FIG. 1, according to an exemplary embodiment.

FIG. 2 depicts a top view of the slotted grommet 100. As can be seen in FIG. 2, the first slot 110 and the second slot 114 intersect at an angle α. In embodiments, the angle α is from 45° to 135°. In the embodiment depicted, the angle α at which the first slot 110 and the second slot 114 intersect is about 90° ("about" meaning within 5°, in particular within 2°). The intersection of the first slot 110 and the second slot 114 establishes continuous communication between the chamber 112 and the passage 116. As will be discussed below, the chamber 112 and the passage 116 create a space within the interior of the body structure 108 within which a cable can be looped and led out within an electrical cavity. Further, in the embodiment depicted in FIG. 2, the chamber 112 includes a floor surface 118 that defines an aperture 120. From FIGS. 2 and 3, it can be seen that the aperture 120 extends between the floor surface 118 and the second surface 104. In this way, the slotted grommet is configured to receive a cable through the aperture 120 into the chamber 112 where it can be looped and led out of the passage 116 of the second slot 114. In other embodiments, the first sidewalls 111 extend the entire thickness between the first surface 102 and the second surface 104 such that the aperture 120 is coextensive with the first slot 110 and such that there is no floor surface 118. That is, essentially the first slot 110 is formed through both the first surface 102 and the second surface 104.

Figure 4:
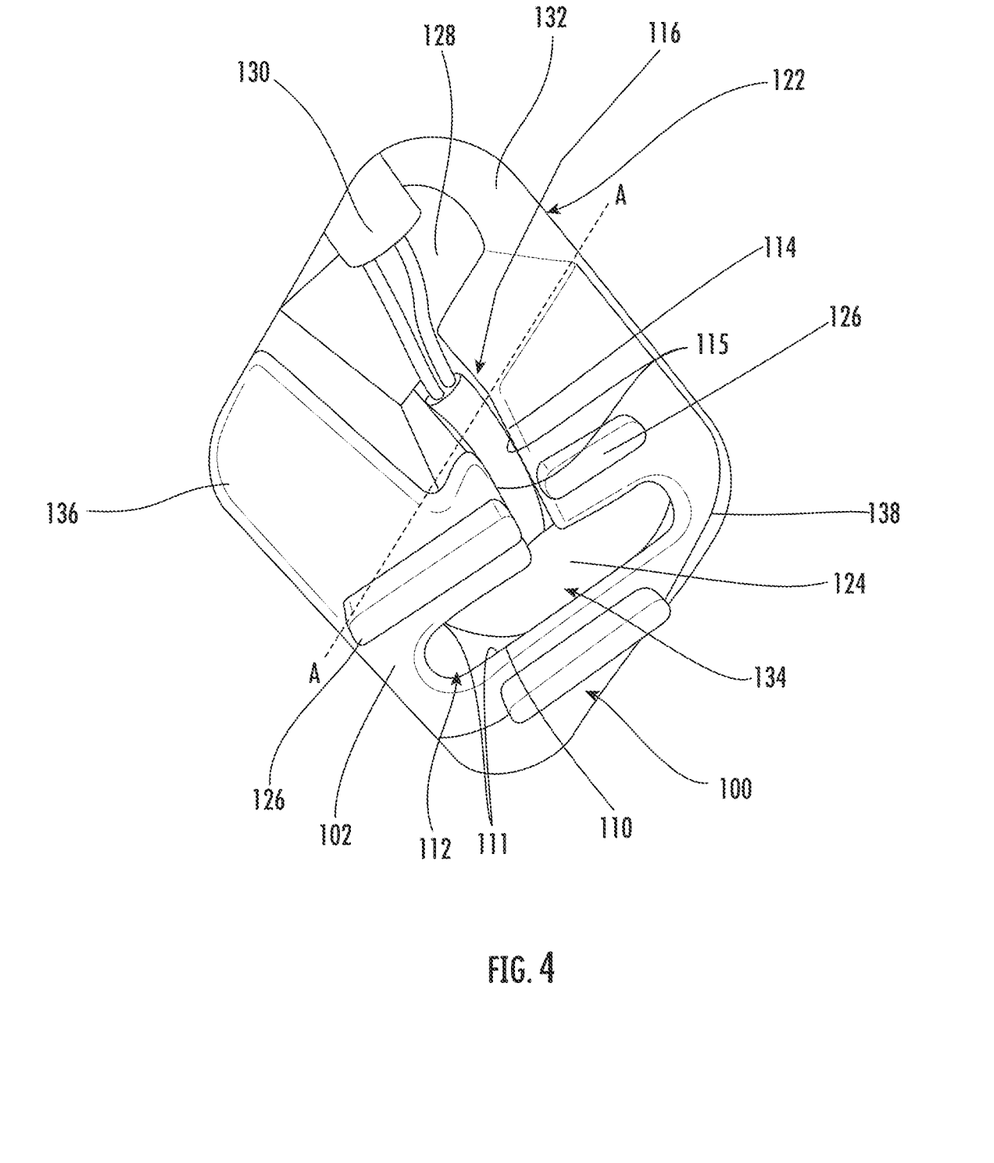
FIG. 4 depicts the slotted grommet of FIG. 1 inserted into an electrical cavity and holding an electrical cable, according to an exemplary embodiment.

FIG. 4 depicts an embodiment of the slotted grommet 100 fitted into an electrical cavity 122. The slotted grommet 100 is configured to fill a substantial portion of the electrical cavity 122 in order to position a cable 124 within the electrical cavity 122. In embodiments, the slotted grommet 100 fills from 50% to 75%, more particularly from 55% to 65%, and in particular about 60% of the volume of electrical cavity 122 ("about" meaning within 2%). As discussed more fully below, certain embodiments of the slotted grommet 100 are configured to fill at most 75% of the electrical cavity 122 to account for swelling of the slotted grommet 100, e.g., related to temperature fluctuations or absorption of fluids. However, where such issues of swelling are not a concern, then embodiments of the slotted grommet 100 may be configured to fill more than 75% of the electrical cavity 122, including 90% or more, or even 95% or more, of the electrical cavity 122. In certain embodiments, the percent of the volume of the electrical cavity 122 filled by the slotted grommet 100 is based on the overall shape of the slotted grommet 100 excluding open air structures, such as the chamber 112, the passage 116, and the aperture 120, of the slotted grommet 100 and excluding the volume of the cable 124.

Additionally, in embodiments, the first surface 102 of the slotted grommet 100 includes one or more reduced area features, such as raised ridges 126. The raised ridges 126 are configured to engage a lid (not shown) of the electrical cavity 122 so that the slotted grommet 100 is compressed between a floor 128 and the lid of the electrical cavity 122 to hold the slotted grommet 100 in place. By using reduced area features, such as the raised ridges 126, the force on the lid is reduced as the area of the slotted grommet 100 in contact with the lid is reduced compared to the force that would be pressed against the lid if the entire first surface 102 were in contact with the lid. In other embodiments, the reduced area feature can be a depression formed in the first surface 102, a plurality of raised bumps or lowered dimples from the first surface 102, or the peripheral surface 106 may taper to the first surface 102 such that the first surface 102 has a desired contact area with the lid.

The electrical cavity 122 includes a first port (not shown), which is underneath the slotted grommet 100, and a second port 130 providing passage through a wall 132 of the electrical cavity 122. A cable 124 enters through the first port and extends through the aperture 120 (shown in FIGS. 2 and 3) into the chamber 112. A loop 134 is formed in the cable 124 within the chamber 112. The term "loop" as used herein refers to a section of cable 124 having one or more bends used to store slack in the cable 124, e.g., for maintenance purposes. The term "loop" includes the configuration in which the cable 124 crosses itself but is not meant to imply that the cable 124 must cross itself. Instead, within the slotted grommet 100, the "loop" of cable 124 may form, e.g., an omega (Ω) shape or a serpentine shape in which the cable 124 bends back and forth, among other bend configurations. The cable 124 exits the slotted grommet 100 through the passage 116 formed by the second slot 114. From the slotted grommet 100, the cable 124 extends through the second port 130 to exit the electrical cavity 122.

In order to hold the cable 124 tightly, the first slot 110 has a width between the first sidewalls 111 that is less than a cross-sectional dimension (e.g., diameter) of the cable 124. Further, the slotted grommet 100 is made of a resilient elastomeric material. In this way, the first sidewalls 111 of the chamber 112 deform where the cable contacts the first sidewalls in order to fit the loop 134 of the cable 124 within the chamber 112, and then the first sidewalls 111 of the chamber 112 recover to squeeze against the cable 124, holding it in place. Similarly, the width of the second sidewalls 115 is configured such that the second sidewalls 115 of the passage 116 squeeze against the cable 124 to hold the cable 124 in place.

In certain embodiments, the slotted grommet 100 is molded from an elastomer. In particular embodiments, the elastomer is a fluoroelastomer, such as Viton™ fluoroelastomer (available from The Chemours Company, Wilmington, Del.). In embodiments, the slotted grommet 100 is made from an elastomer having a Shore A hardness of 50 to 70, more particularly 50 to 60, and in particular about 55 ("about" meaning within 5%). In embodiments, the slotted grommet 100 is made from a material having an elongation at break of 100% to 500%. Further, in embodiments, the elastomer has an operating temperature range of at least −40° C. to 200° C. Advantageously, when the elastomer is a fluoroelastomer, such as Viton™ fluoroelastomer, the slotted grommet provides chemical resistance to solvents and fuel that may be present or leak into the electrical cavity. Notwithstanding, the fluorolastomer may absorb some of the fuel or solvent and swell, which is why the volume of the electrical cavity 122 is preferably only filled to at most 75% to allow room for such swelling in the illustrated embodiment.

As can be seen in FIGS. 1-4, the slotted grommet 100 includes an extension section 136 and a cable management section 138. As shown in FIG. 4, the extension section 136 is configured to engage the walls 132 of the electrical cavity 122. Further, the slotted grommet 100 includes a cable management section 138 (i.e., the portion of the body structure 108 holding and directing the path of the cable 124) and an extension section 136 for positioning the slotted grommet 100 within the electrical cavity 122. With reference to FIGS. 1-4, dashed line A-A essentially divides the slotted grommet 100 between the cable management section 138 and the extension section 136. In particular, the cable management section 138 may occupy a relatively small portion of the electrical cavity 122 and could be contained between only two opposing sidewalls 130 of the electrical cavity 122. However, in order to better ensure that the cable 124 does not move or rub within the electrical cavity 122, the extension section 136 may be provided so that the slotted grommet 100 can be in contact with two sets of opposing sidewalls 132 within the electrical cavity 122, thereby fixing the position of the slotted grommet 100 within the electrical cavity 122.

In embodiments, the extension section 136 is configured as an arm that extends from the cable management section 138 of the slotted grommet 100. Because the slotted grommet 100 is constructed of an elastomeric material, the extension section 136 is flexible. In this way, the extension section 136 can be curled or compressed to reduce the width of the slotted grommet 100 when inserting the slotted grommet 100 into the electrical cavity 122. Once the slotted grommet 100 is positioned within the electrical cavity 122, the extension section 136 is allowed to uncurl, decompress, or expand into abutment with the sidewall 132 of the electrical cavity 122. In this way, the slotted grommet 100 can be wedged into the electrical cavity 122.

Figure 5:
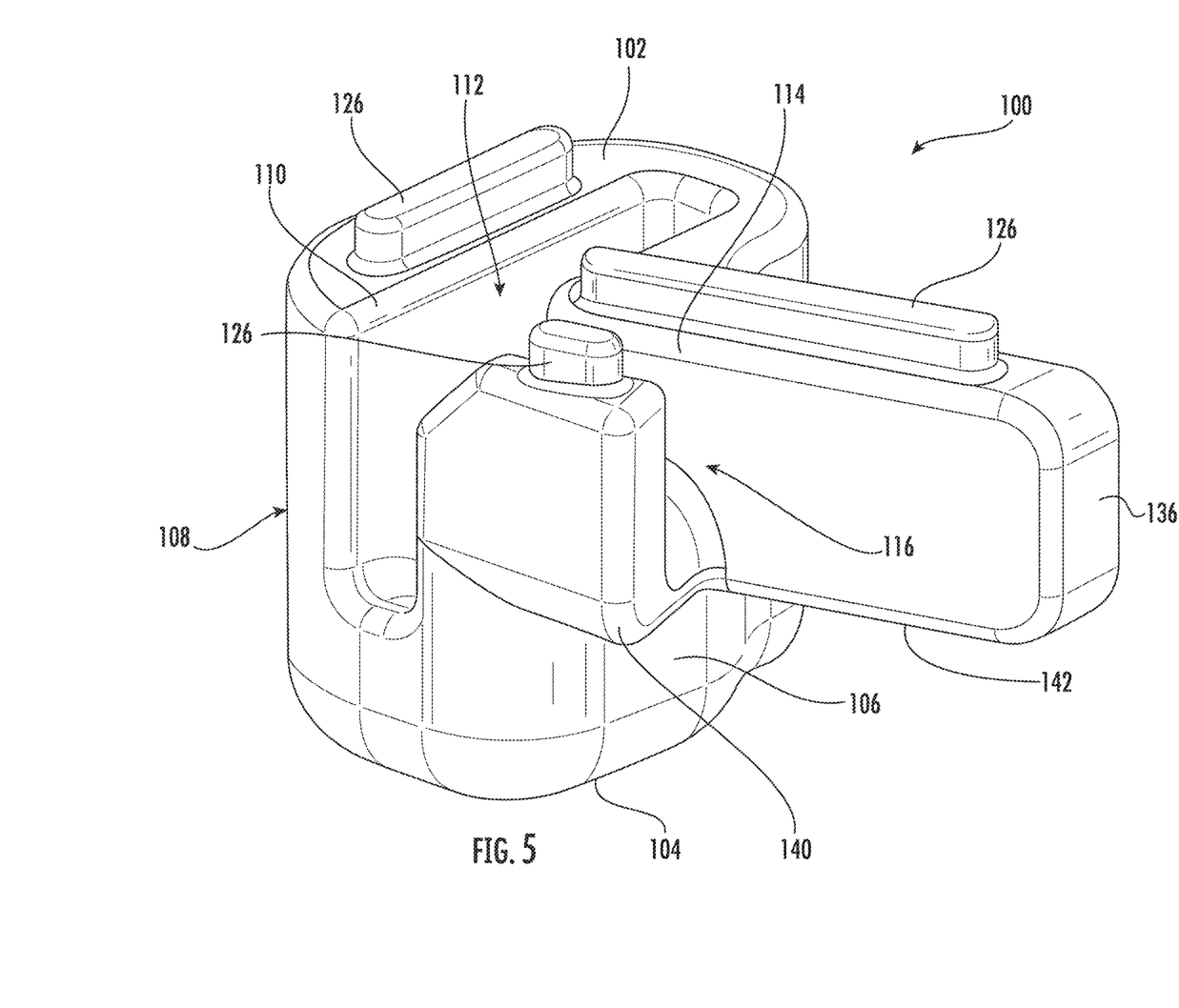
FIG. 5 depicts a perspective view of another slotted grommet, according to an exemplary embodiment.

As can be appreciated, the shape and configuration of an electrical cavity can vary depending on the installation. Thus, a second embodiment of the slotted grommet 100 is depicted in FIGS. 5-11. Referring first to FIG. 5, the first slot 110 is formed in both the first surface 102 and the peripheral surface 106 to create the chamber 112 in the body structure 108. The second slot 114 is formed through the first surface 102, defining the passage 116. As can be seen in FIG. 5, the first surface 102 and the second surface 104 are not coextensive in terms of their respective peripheral boundaries. Instead, the first surface 102 defines a larger peripheral boundary than the second surface 104. In particular, the extension section 136 of the slotted grommet does not extend the entire thickness between the first surface 102 and the second surface 104, creating an intermediate overhang 140. The intermediate overhang 140 defines a third surface 142 of the extension section 136 that opposes the first surface 102 of the slotted grommet 100. In embodiments, the extension section 136 has a thickness between the first surface 102 and the third surface 142 that extends 25% to 75%, more particularly 40% to 60%, and in particular about 50% ("about" meaning within 5%), of the thickness of the slotted grommet 100 between the first surface 102 and the second surface 104. In certain embodiments, the thickness of the extension section 136 is determined by the shape of the electrical cavity into which it designed to be fitted.

Figure 6:
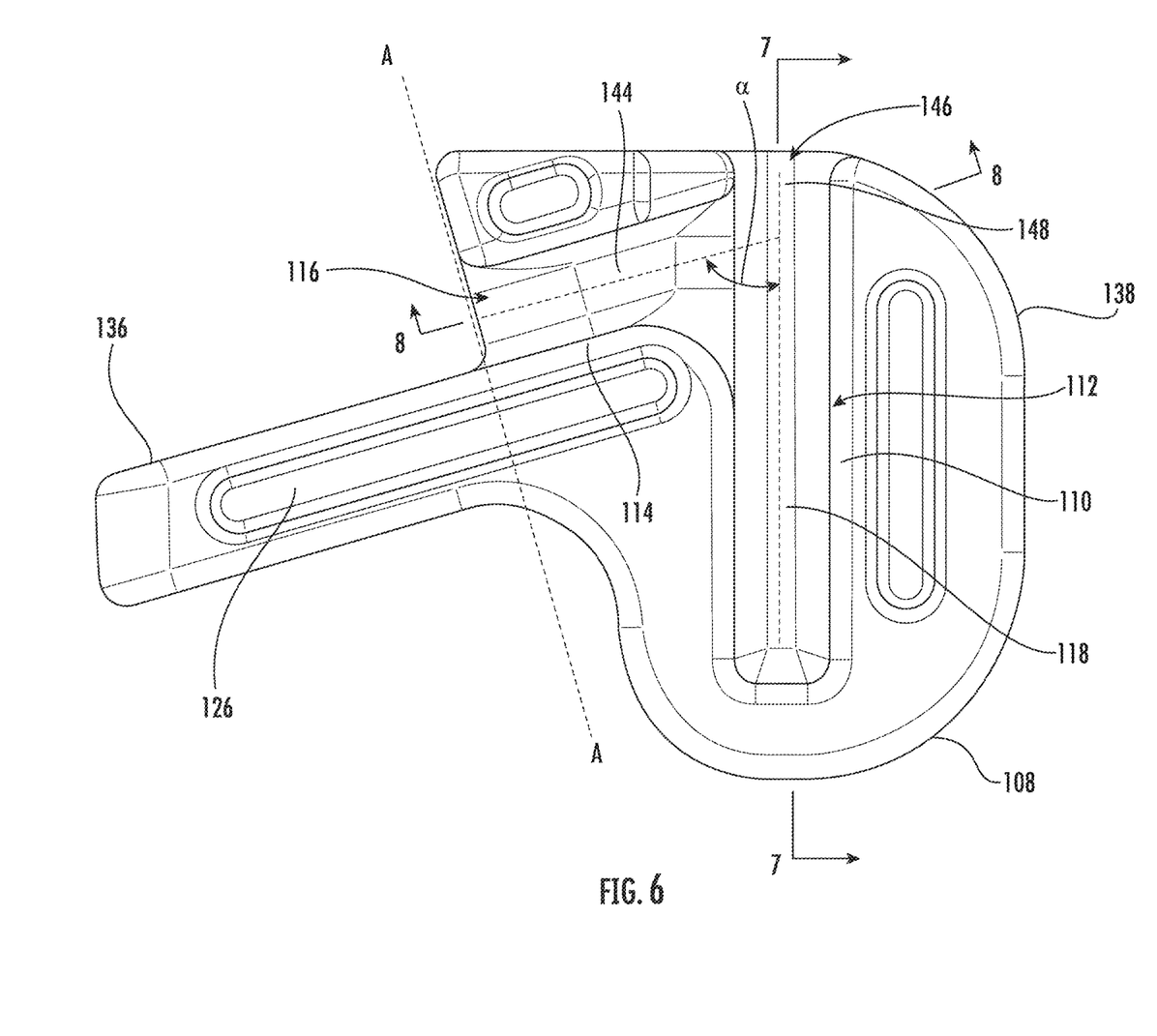
FIG. 6 depicts a top view of the slotted grommet of FIG. 5, according to an exemplary embodiment.

FIG. 6 depicts a top view of the slotted grommet 100. As can be seen in FIG. 6, the first slot 110 and the second slot 114 intersect at an angle α. In embodiments, the angle α is from 45° to 135°. In the embodiment depicted, the angle α at which the first slot 110 and the second slot 114 intersect is about 75°. The intersection of the first slot 110 and the second slot 114 establishes continuous communication between the chamber 112 and the passage 116. As with the prior embodiment, the chamber 112 provides a space on the interior of the body structure 108 within which a cable can be looped.

The chamber 112 includes a floor surface 118, and the passage 116 includes a passage floor surface 144. Further, first slot 110 defines a second passage 146 though the peripheral surface 106 having a second passage floor surface 148. In embodiments, the passage floor surface 144 and the second passage floor surface 148 are located in planes different from the plane of the floor surface 118 of the chamber 112. Further, in embodiments, the passage floor surface 144 is located in a plane different from the plane of the second passage floor surface 148. In embodiments, the plane of the second passage floor surface 148 is intermediate of the plane of the passage floor surface 144 and of the plane of the floor surface 118.

Figure 7:
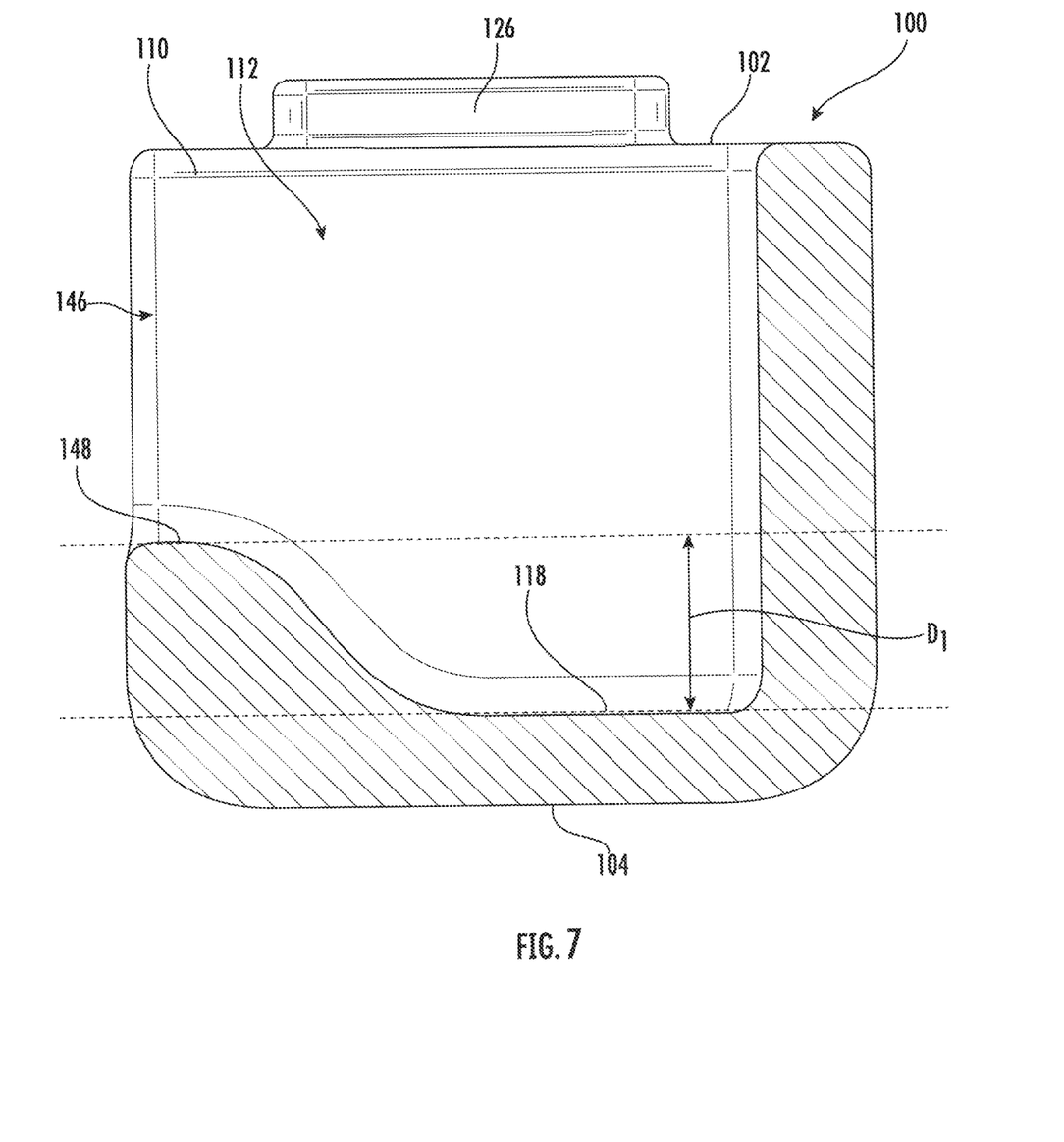
FIG. 7 depicts a cross-sectional view of the slotted grommet taken along line 7-7 of FIG. 6, according to an exemplary embodiment.
Figure 8:
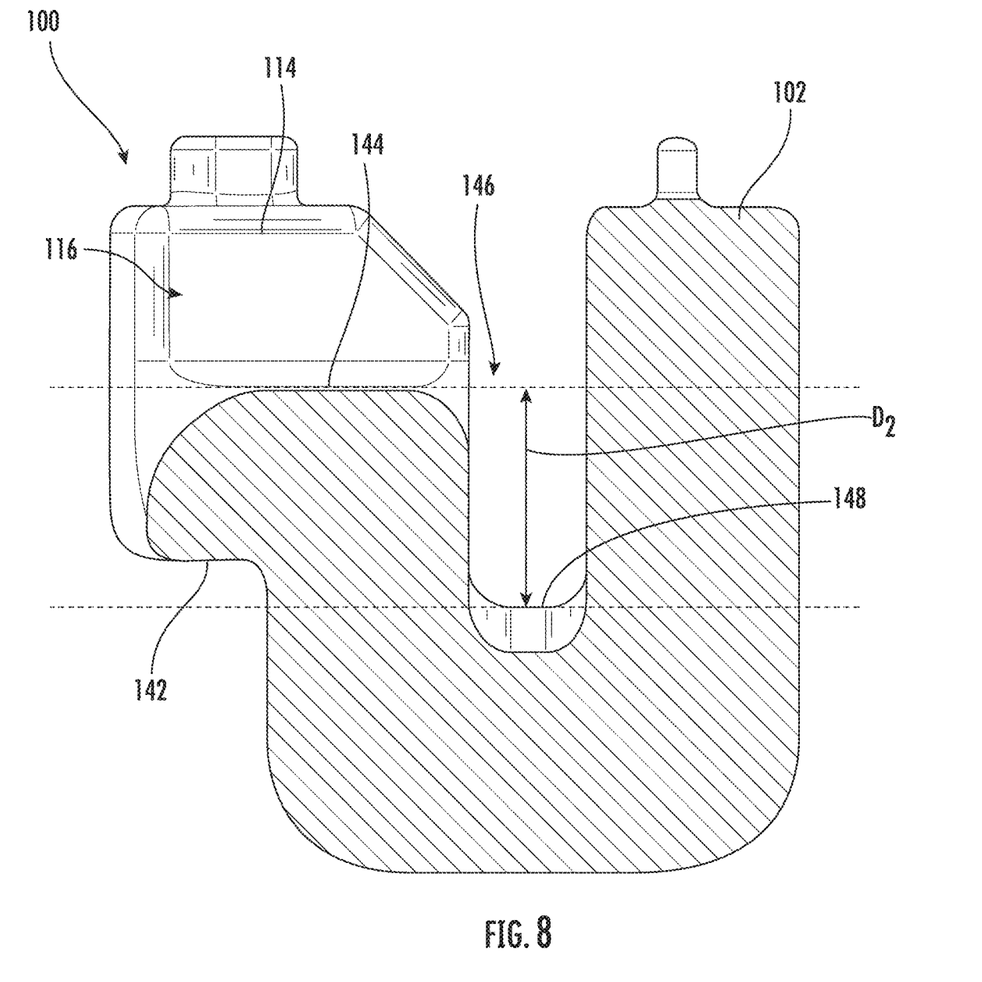
FIG. 8 depicts a cross-sectional view of the slotted grommet taken along line 8-8 of FIG. 6, according to an exemplary embodiment.

FIG. 7 depicts a cross-sectional view of the chamber 112 defined by the first slot 110. As can be seen in FIG. 7, the plane of the floor surface 118 is spaced apart from the plane of the second passage floor surface 148 by a first distance $D_1$. FIG. 8 depicts a cross-sectional view taken along the passage 116 defined by the second slot 114. As can be seen in FIG. 8, the plane of the second passage floor surface 148 is spaced apart from the plane of the passage floor surface 144 by a second distance $D_2$. With reference to FIGS. 7 and 8, the second distance $D_2$ is greater than or equal to the first distance $D_1$. In embodiments, the second distance $D_2$ is 15% to 25%, in particular about 20% to 22%, greater than the first distance $D_1$. The spacing defined by the chamber 112, passage 116, and second passage 146 allow a cable to enter, e.g., through the second passage 146, be looped in the chamber 112, and be led out of the passage 116 within an electrical cavity.

Figure 9:
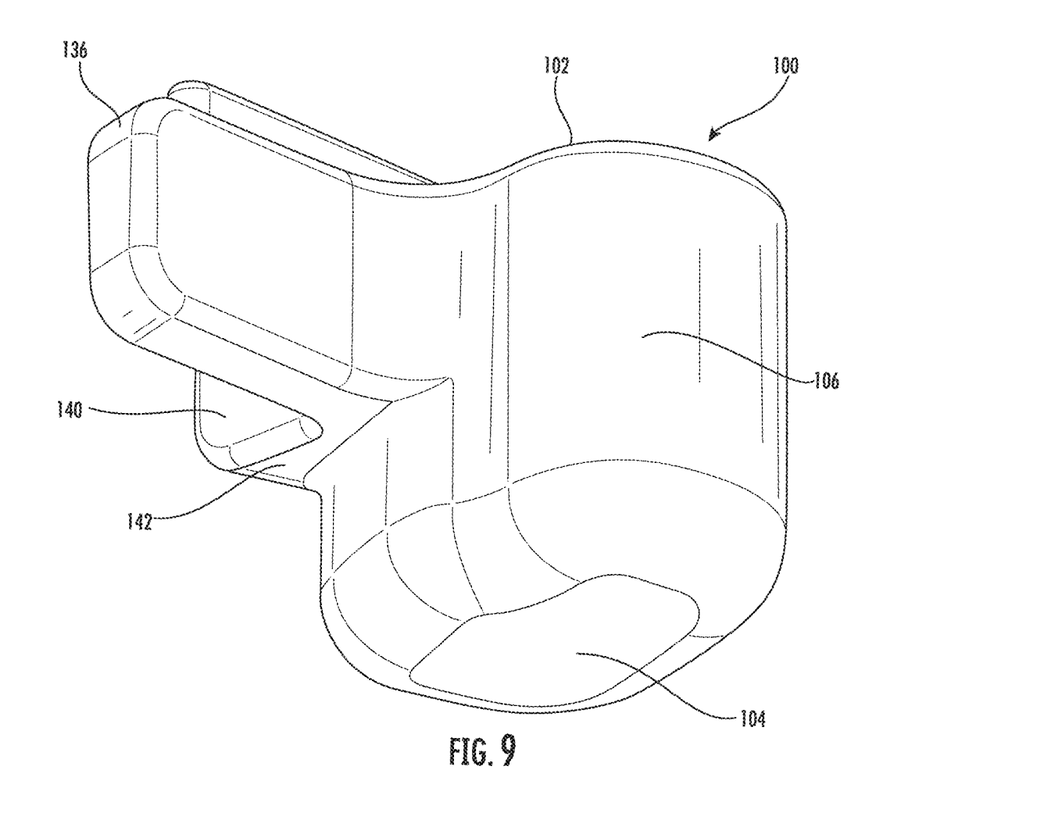
FIG. 9 depicts another perspective view of the slotted grommet of FIG. 5, according to an exemplary embodiment.

FIG. 9 depicts a perspective view of the slotted grommet 100 showing the second surface 102 and the third surface 142. This view further demonstrates the tiered structure of the slotted grommet 100 that defines the intermediate overhang 140. As mentioned above, the second surface 104 defines a smaller peripheral boundary than the first surface 102. In this way, the slotted grommet 100 is able to fit in a variety of differently shaped electrical cavities. For example, the tiered structure of the slotted grommet 100 allows the slotted grommet 100 to fit into tiered cavities. At the same time, the slotted grommet 100 can fit into cavities into which only the portion below the intermediate overhang 140 can fit.

Figure 10:
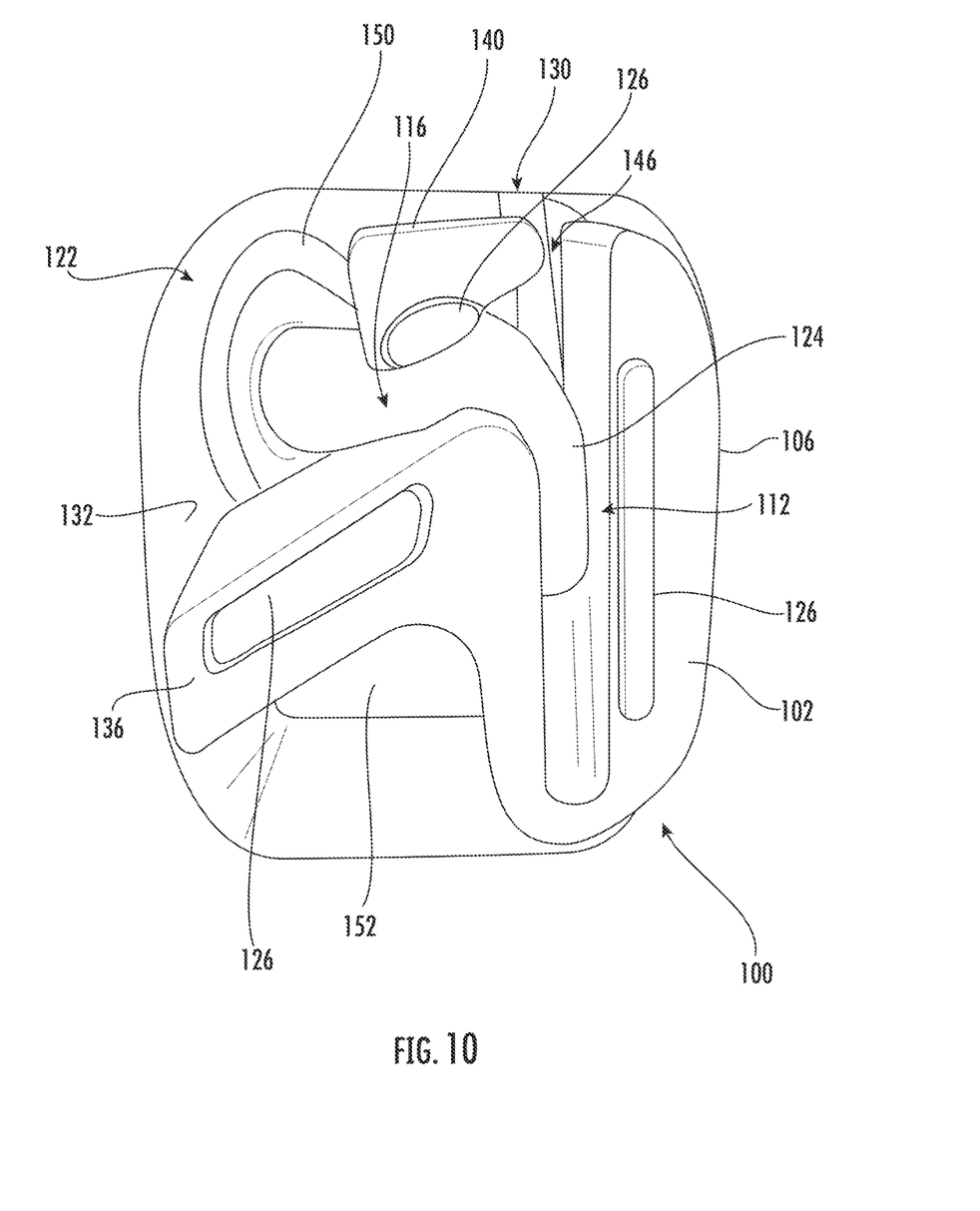
FIG. 10 depicts the slotted grommet of FIG. 5 inserted into an electrical cavity of a first shape and holding an electrical cable, according to an exemplary embodiment.

The embodiment of the slotted grommet 100 of FIGS. 5-9 is shown in FIG. 10 as inserted into a tiered electrical cavity 122. As shown in FIG. 10, the cable 124 extends from the port 150 in the sidewall 132, and the cable 124 enters the second passage 146, is looped in the chamber 112, and exits through the passage 116. The cable 124 then connects to a port 150 in an upper ledge 152 of the electrical cavity 122. The overhang region 140 abuts the upper ledge 152, and the portion of the slotted grommet 100 below the overhang region 140 is fitted within a portion of the electrical cavity 122 below the upper ledge 152. Further, the peripheral surface 106 and extension section 136 abut the sidewall 132 of the electrical cavity 122 to hold the slotted grommet 100 in place.

The slotted grommet 100 operates in the manner described above. Namely, the slotted grommet 100 is made of an elastomeric material that compresses around the cable 124 to keep it in place within the electrical cavity. Further, the elastomeric material of the slotted grommet 100 allows the slotted grommet 100 to compress for insertion into the electrical cavity 122 and expand to create a tight fit within the electrical cavity 122. Further, the reduced area component, e.g., raised ridges 126 extending from the first surface 102, allow the lid of the electrical cavity 122 to further compress slotted grommet 100, holding it and the cable 124 in place.

Figure 11:
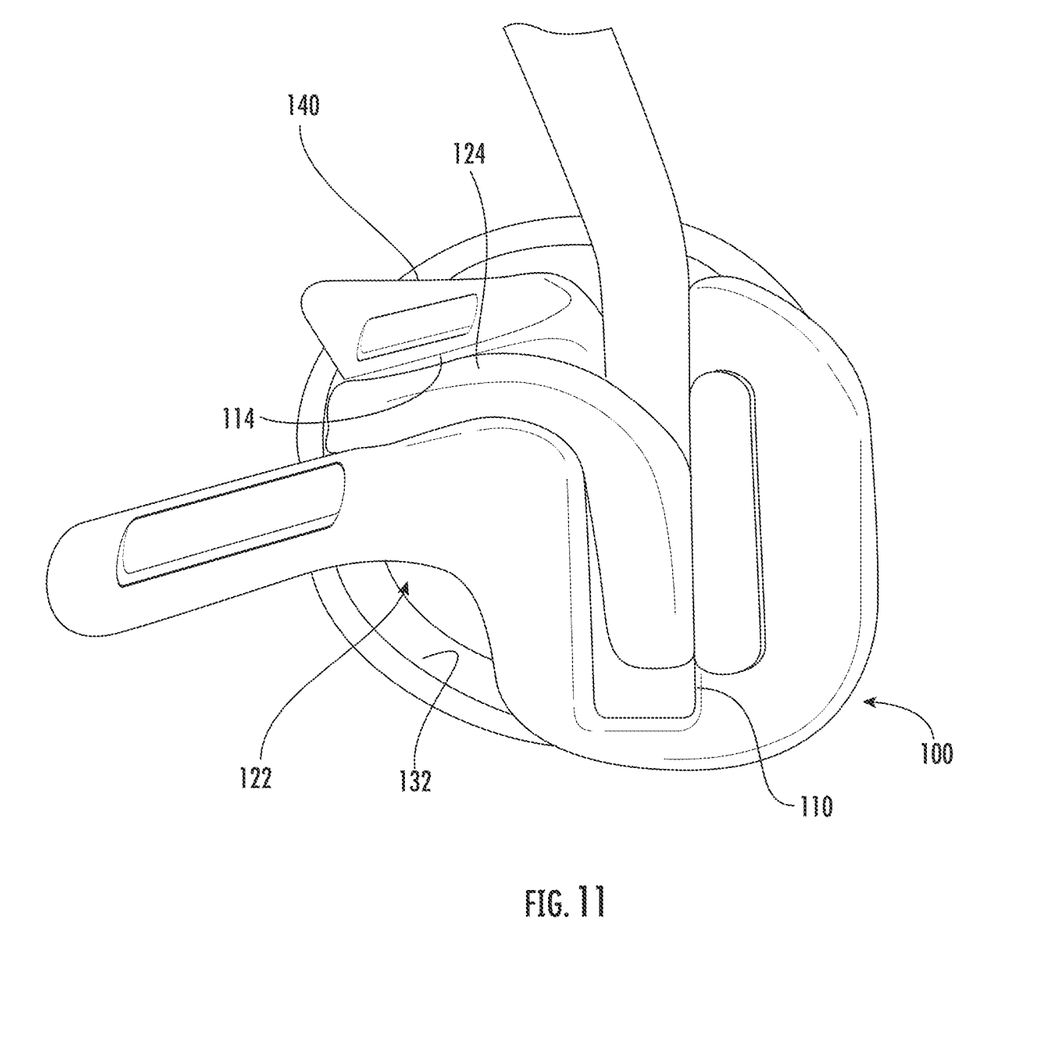
FIG. 11 depicts the slotted grommet of FIG. 5 inserted into an electrical cavity of a second shape and holding an electrical cable, according to an exemplary embodiment.

FIG. 11 depicts an embodiment of a slotted grommet 100 partially inserted into an electrical cavity 122. As can be seen, the electrical cavity 122 is smaller than the slotted grommet 100 such that only the portion of the slotted grommet 100 below the intermediate overhang 140 is inserted into the electrical cavity 122. Notwithstanding, the slotted grommet 100 is able to manage the cable 124 to prevent chafing within the electrical cavity 122.

Figure 12A:
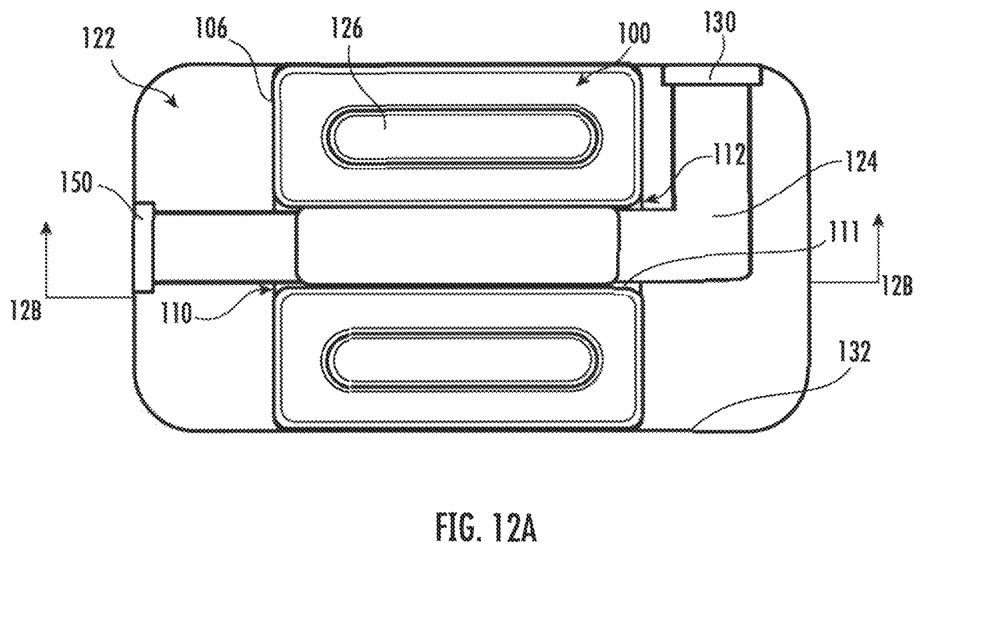
FIGS. 12A and 12B a top view and a cross-sectional view, respectively, of another slotted grommet having a single slot, according to an exemplary embodiment.
Figure 12B:
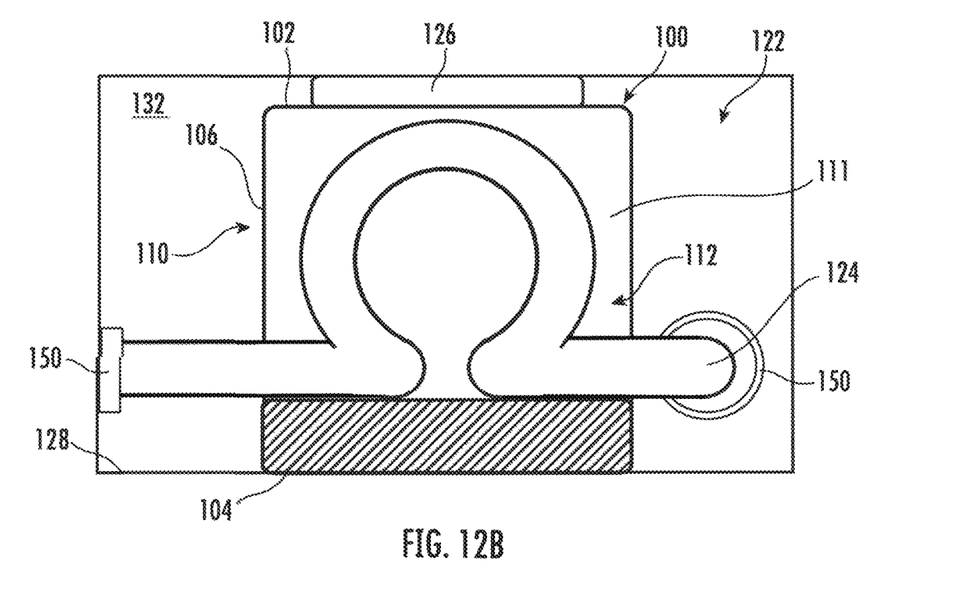

FIGS. 12A and 12B depict another embodiment of a slotted grommet 100. FIG. 12A is a top view of the slotted grommet 100 as inserted into an electrical cavity 122. In this embodiment, the slotted grommet 100 includes a single slot 110. In the embodiment depicted, the single slot 110 defines a chamber 112 extending through opposite sides of the peripheral surface 106. A cable 124 enters the electrical cavity 122 through a first port 130, is looped through the slotted grommet 100 (being held in place by the sidewalls 111 of the slot 110), and exits the electrical cavity 122 through the other port 150. The slotted grommet 100 is secured within the electrical cavity 122 between opposing walls 132 of the electrical cavity 122. FIG. 12B depicts a cross-sectional view of the slotted grommet 100 taken along line 12B-12B of FIG. 12A. As can be seen in FIG. 12B, the cable 124 enters the slot 110 through one side of the peripheral surface 106, is looped (e.g., in an Ω shape) within the slot 110, and exits through an opposing side of the peripheral surface 106. Further, in the embodiment depicted, the second surface 104 of the slotted grommet 100 abuts the floor 128 of the electrical cavity 122, and the first surface 102 includes a reduced area component (depicted as raised ridges 126) configured to engage a lid (not shown) of the electrical cavity 122.

In another single slot embodiment, the slot 110 extends through one side of the peripheral surface 106 toward (but not through) an opposite side of the peripheral surface 106. An aperture (such as aperture 120 shown in FIG. 3) is formed through the second surface 104 of the slotted grommet 110. In such an embodiment, the cable 124 extends through the aperture into the chamber 112 defined by the slot 110 where the cable 124 is looped and held between the sidewalls 111. The cable 124 then extends from the chamber 112 through the peripheral surface 106 back into the electrical cavity 122. Other configurations are also possible. For example, an embodiment of a slotted grommet 100 includes a slot 110 that does not extend through any peripheral surface 106 and also includes a first aperture through which the cable 124 enters the chamber 112 of the slot 110 and a second aperture through which the cable 124 exits the chamber 112 of the slot 110.

While embodiments of slotted grommets 100 disclosed herein have been depicted and discussed as having one or two slots, other embodiments of a slotted grommet according to the present disclosure have more than two slots. For example, the slotted grommet can be configured to hold more than one cable in place within an electrical cavity, and each cable can enter the slotted grommet from a same or different peripheral side or aperture and exit the slotted grommet through the same or different passage.

The embodiments of the slotted grommet 100 disclosed herein provide protection for a cable 124 against vibrationally-induced chafing within an electrical cavity 122. In particular, the slotted grommet 100 secures the cable within the slots 110 and 114 to prevent the cable from contacting the walls 132, floor 128, or lid of the electrical cavity 122. The slotted grommet 100 is itself interference fit (at least locally) within the electrical cavity 122 to prevent the slotted grommet 100 from moving. As such, the slotted grommet 100 and cable 124 remain in place even at high G vibration levels. Further, embodiments of the slotted grommet 100 are made of a robust fluoroelastomer material that provides a wide operational temperature range (−55° C. to 205° C.) and resistance to degradation from fuel or solvents. Additionally, the slotted grommet 100 is relatively inexpensive and small compared to other cable management devices, and the slotted grommet 100 allows for relative ease in retrofitting and maintenance as compared to such cable management devices and potting compounds. In particular, the slotted grommet 100 allows for a loop of cable 124 to be securely held in the electrical cavity 122 that can be unlooped to provide additional cable length for maintenance activities involving the cable 124.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A slotted grommet configured to manage a cable in an electrical cavity, the slotted grommet comprising:
   a body structure comprising a first surface, a second surface opposite to the first surface, and a peripheral surface extending between the first surface and the second surface; and
   a first slot formed in the first surface and extending through the body structure towards the second surface, the first slot defining a chamber having first sidewalls in the body structure configured to hold a loop of the cable;
   wherein the first slot has a first width that is less than a cross-sectional dimension of the cable such that the cable is pinched within the chamber between the first sidewalls.

2. The slotted grommet of claim 1, wherein the body structure comprises a fluoroelastomer.

3. The slotted grommet of claim 2, wherein the fluoroelastomer comprises a Shore A hardness of 50 to 70.

4. The slotted grommet of claim 1, wherein the first slot extends from the first surface to the second surface.

5. The slotted grommet of claim 1, wherein the first slot comprises a floor surface intermediate of the first surface and the second surface and wherein an aperture extends from the floor surface to the second surface.

6. A slotted grommet configured to manage a cable in an electrical cavity, the slotted grommet comprising:
   a body structure comprising a first surface, a second surface opposite to the first surface, and a peripheral surface extending between the first surface and the second surface; and
   a first slot formed in the first surface and extending through the body structure towards the second surface, the first slot defining a chamber having first sidewalls in the body structure configured to hold a loop of the cable;
   wherein the first slot has a first width that is less than a cross-sectional dimension of the cable such that the cable is pinched within the chamber between the first sidewalls; and
   a second slot formed in the first surface and in the peripheral surface, the second slot intersecting with the first slot and defining a first passage having second sidewalls, wherein the first passage intersects the chamber and wherein the second slot has a second width that is less than the cross-sectional dimension of the cable such that the cable is pinched within the first passage between the second sidewalls.

7. The slotted grommet of claim 6, wherein the first slot and the second slot intersect at an angle of 45° to 135°.

8. The slotted grommet of claim 6, wherein the body structure comprises a cable management section and an extension section, the cable management section including the first slot and the second slot and the extension section configured to engage a wall of the electrical cavity.

9. The slotted grommet of claim 8, wherein the extension section spans 25% to 100% of a thickness between the first surface and the second surface.

10. The slotted grommet of claim 9, wherein the first slot defines a second passage through the peripheral surface.

11. The slotted grommet of claim 10, wherein the first passage comprises a first floor surface, the second passage comprises a second floor surface, and the chamber comprises a third floor surface; and
   wherein a first plane including the first floor surface and a second plane including the second floor surface are parallel to and spatially disposed from a third plane including the third floor surface.

12. The slotted grommet of claim 11, wherein the first plane is parallel to and spatially disposed from the second plane such that the second floor surface is intermediate of the first floor surface and the third floor surface.

13. A method of preventing chafing of a cable in an electrical cavity, comprising:
   inserting a slotted grommet into the electrical cavity, the slotted grommet comprising:
      a body structure comprising a first surface, a second surface opposite to the first surface, and a peripheral surface extending between the first surface and the second surface; and
      a first slot formed in the first surface and extending through the body structure towards the second surface, the first slot defining a chamber having first sidewalls in the body structure;
   first extending the cable into the slotted grommet;
   looping the cable within the chamber so that the cable is held between the first sidewalls; and
   second extending the cable out of the slotted grommet.

14. The method of claim 13, wherein the slotted grommet further comprises a second slot formed in the first surface and in the peripheral surface, the second slot intersecting with the first slot and defining a first passage having second sidewalls, wherein the first passage intersects the chamber and wherein the method further comprises pinching the cable in the first passage between the second sidewalls.

15. The method of claim 13, wherein the first slot defines a second passage through the peripheral surface and wherein first extending or second extending further comprises extending the cable into or out of the slotted grommet through the second passage.

16. The method of claim 13, wherein inserting further comprises filling from 50% to 75% of a volume of the electrical cavity with the slotted grommet.

17. The method of claim 13, wherein the body structure comprises a cable management section and an extension section, wherein the cable management section includes the first slot, and wherein the method further comprises engaging a wall of the electrical cavity with the extension section.

18. The method of claim 17, wherein the extension section spans from 25% to 75% of a thickness between the first surface and the second surface such that the extension section defines an intermediate overhang, wherein the electrical cavity comprises a tiered structure with an upper ledge and a lower ledge, and wherein the method further comprises contacting the lower ledge with the second surface and contacting the upper ledge with the extension section.

19. The method of claim 13, wherein the slotted grommet further comprises at least one reduced area component formed on or into the first surface of the body structure and wherein the method further comprises contacting a lid of the electrical cavity with the reduced area component or the first surface.

20. A method of preventing chafing of a cable in an electrical cavity, comprising:
   inserting a slotted grommet into the electrical cavity, the slotted grommet comprising:
      a body structure comprising a first surface, a second surface opposite to the first surface, and a peripheral surface extending between the first surface and the second surface; and
      a first slot formed in the first surface and extending through the body structure towards the second surface, the first slot defining a chamber having first sidewalls in the body structure;
   first extending the cable into the slotted grommet;
   looping the cable within the chamber so that the cable is held between the first sidewalls;
   second extending the cable out of the slotted grommet; and
   wherein the first slot comprises an aperture through the second surface, and wherein first extending or second extending further comprises extending the cable into or out of the slotted grommet through the aperture.

* * * * *